United States Patent
Zhang et al.

(10) Patent No.: US 7,245,458 B2
(45) Date of Patent: Jul. 17, 2007

(54) SYSTEM AND METHOD FOR IMPROVING THE ELECTRICAL CONNECTION OF A HARD DRIVE RELAY FLEXIBLE CIRCUIT ASSEMBLY OF AN HGA FLEXURE CABLE

(75) Inventors: Liu Jun Zhang, Dongguan (CN); Guo Hong Lu, Dongguan (CN); Can Hua Chen, Dongguan (CN); Yiu Sing Ho, Shatin (HK); Jeffery L. Wang, Tai Po (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 220 days.

(21) Appl. No.: 10/767,029

(22) Filed: Jan. 28, 2004

(65) Prior Publication Data

US 2005/0011065 A1 Jan. 20, 2005

(30) Foreign Application Priority Data

Jul. 14, 2003 (WO) .................... PCT/CN03/00555

(51) Int. Cl.
*G11B 5/55* (2006.01)

(52) U.S. Cl. ................................................. 360/264.2
(58) Field of Classification Search ............. 360/264.2
See application file for complete search history.

(56) References Cited

U.S. PATENT DOCUMENTS

| 5,844,753 | A | 12/1998 | Inaba ........................ 360/104 |
| 6,487,053 | B1 | 11/2002 | Matsumura et al. ...... 360/265.7 |
| 6,781,795 | B2 * | 8/2004 | Abe et al. ................ 360/264.2 |
| 2002/0159196 | A1 | 10/2002 | Watanabe ................ 360/264.7 |

FOREIGN PATENT DOCUMENTS

CN 1363098 T 2/2001

* cited by examiner

*Primary Examiner*—David Davis
(74) *Attorney, Agent, or Firm*—Kenyon & Kenyon LLP (57) ABSTRACT

A system and method are disclosed for improving the electrical connection of a hard drive relay flexible circuit assembly to a head-gimbal assembly (HGA) flexure cable. In one embodiment, a flexible circuit assembly is attached to a hard drive coil carriage via a U-shaped connector and is electrically coupled to the HGA flexure cable by a bonding agent, such as an Anisotropic Conductive Film (ACF).

28 Claims, 10 Drawing Sheets

SYSTEM AND METHOD FOR IMPROVING THE ELECTRICAL CONNECTION OF A HARD DRIVE RELAY FLEXIBLE CIRCUIT ASSEMBLY OF AN HGA FLEXURE CABLE

BACKGROUND INFORMATION

The present invention relates to hard disk drives. More specifically, the invention relates to a system and method for improving the electrical connection of a hard drive relay flexible circuit assembly to a head-gimbal assembly (HGA) flexure cable.

Figure 1:
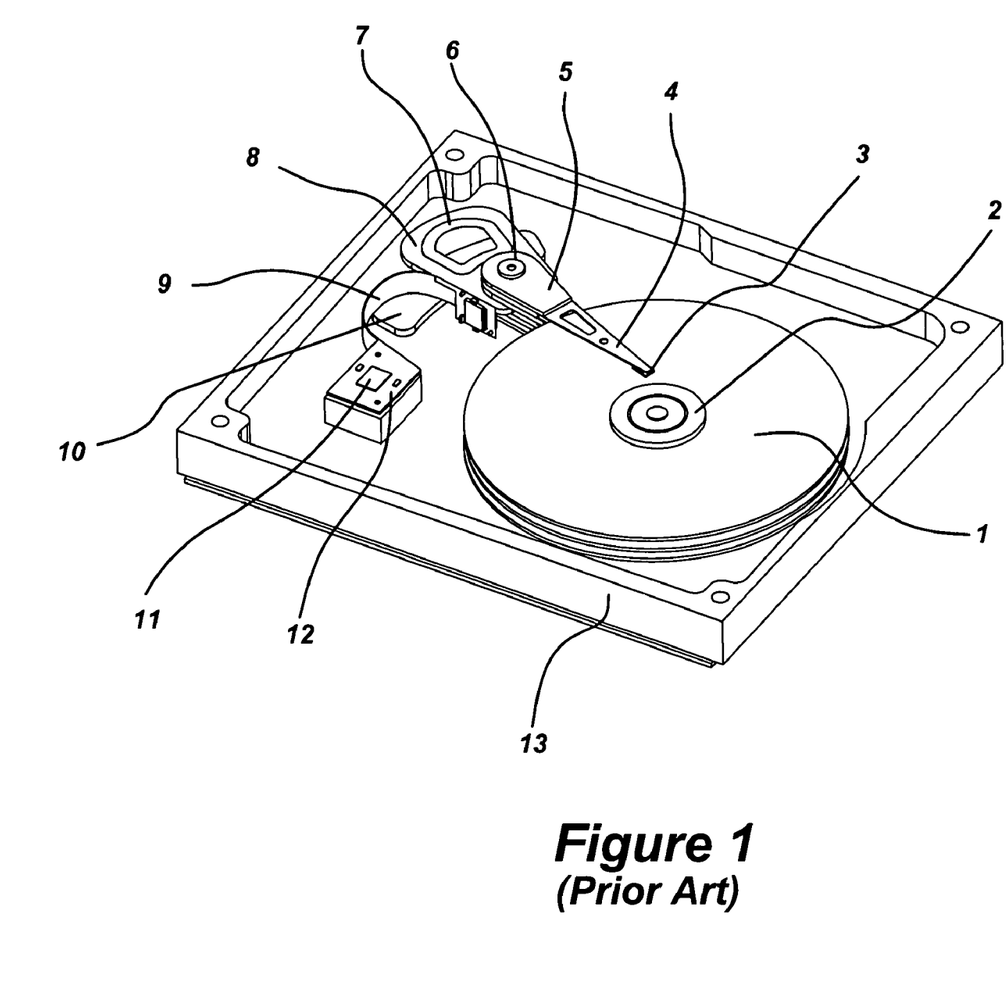
FIG. 1 provides an illustration of a typical hard disk drive.

FIG. 1 provides an illustration of a typical hard disk drive. Hard disk drive storage devices typically include a rotating disk 1 mounted for rotation by a spindle motor 2. A slider 3, supported by an actuator arm 5, 'flies' over the surface of the magnetic disk 1 at a high velocity reading data from and writing data to concentric data tracks on the disk 1. The slider 3 is positioned radially by a voice coil 7 embedded in a voice coil carriage 8.

In typical hard disk drives, electrical control signals are communicated to the voice coil 7 by a relay flexible circuit 9. Typically, the relay flexible circuit 9 also communicates read/write data to the slider/head(s) 3. A printed circuit board (PCB) 11 operates to control the position of the arm(s) 5 with head/slider(s) 3 (also known as the head stack assembly (HSA)).

Figure 2:
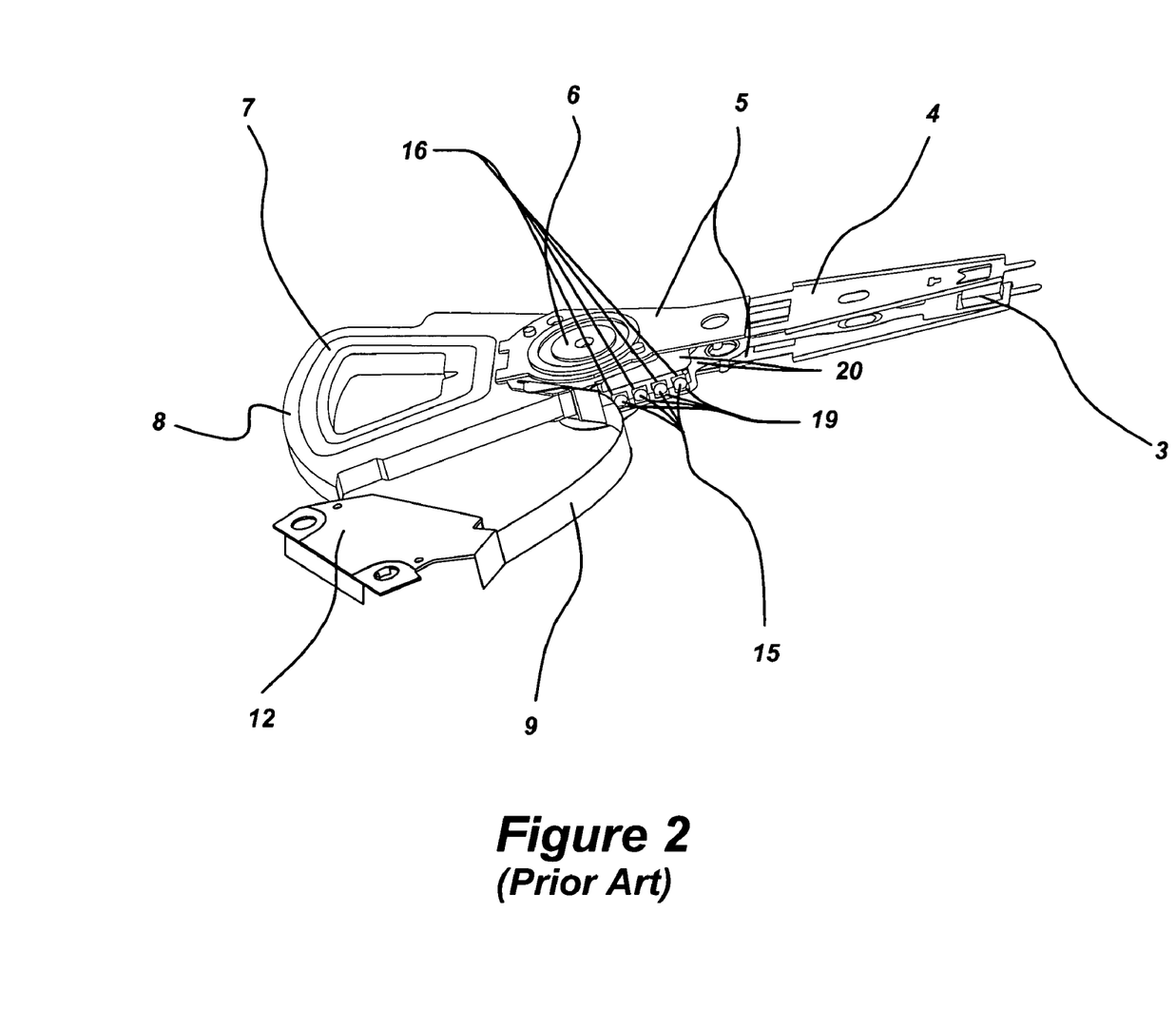
FIG. 2 shows a more detailed view of a head stack assembly (HSA) typical in the art.

FIG. 2 shows a more detailed view of a head stack assembly (HSA) typical in the art. The actuator arm 5 is mounted on the actuator assembly (not shown) and affixed to a pivot member 6. The actuator arms 5 each have a suspension flexure cable (HGA flexure cable) 20 running from the heads/sliders 3 to a plurality connecting pads 19. The connecting pads 19 are electrically coupled to the flexible circuit assembly 9 by bonding (e.g., by solder bump or gold ball bonding 15) the flexure cable connecting pads 19 to a plurality of flexible circuit bonding pads 16.

Figure 3:
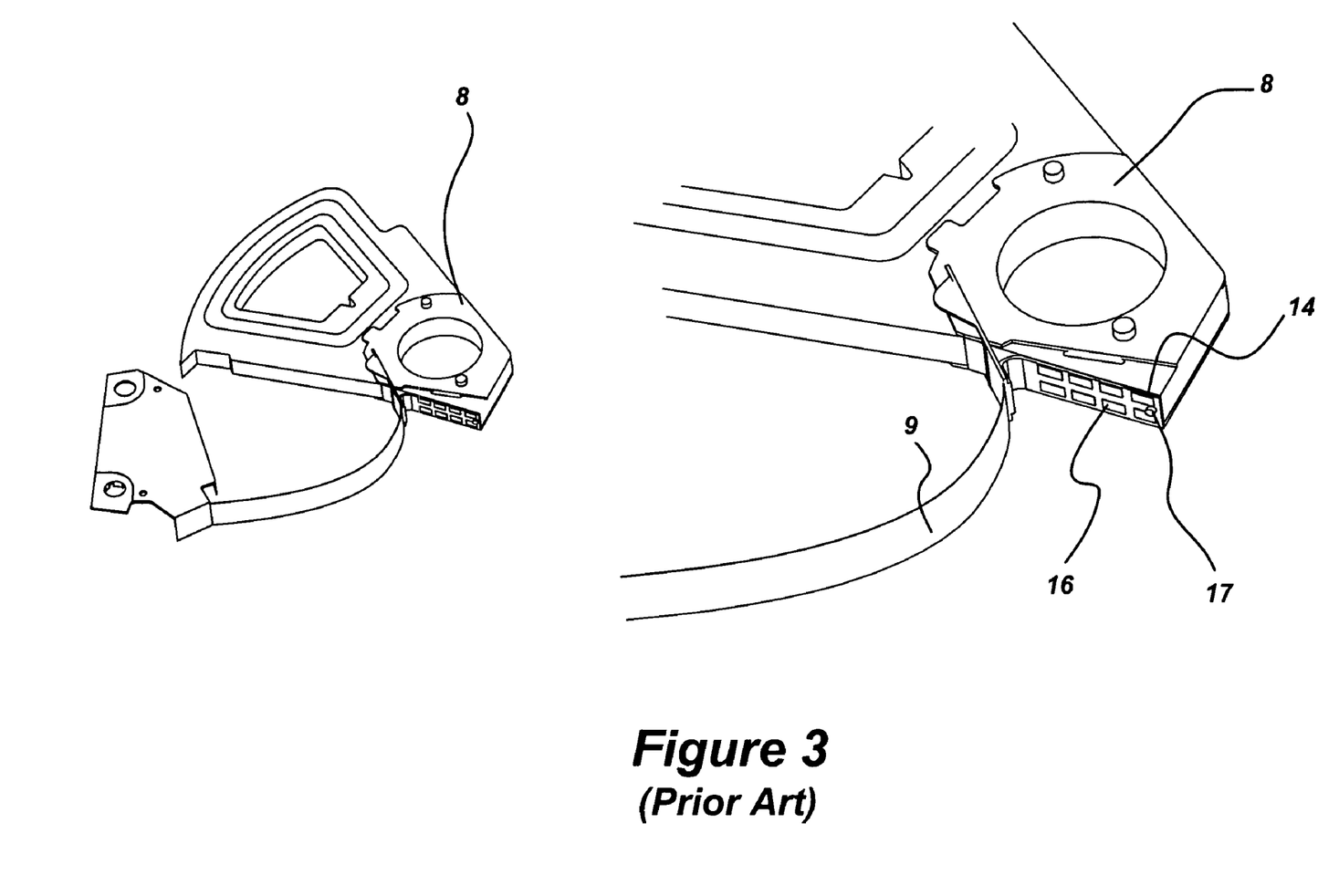
FIG. 3 provides a more detailed illustration of the voice coil actuator assembly as is typical in the art.

FIG. 3 provides a more detailed illustration of the voice coil actuator assembly as is typical in the art. A relay flexible circuit 9 is aligned upon the coil carriage 8 by an alignment pin 17 protruding from the coil carriage 8 (inserted in a hole in a circuit board 14 terminating the flexible circuit assembly 9). After positioning, the flexible circuit assembly 9 may be electrically coupled to the HGA (not shown), as illustrated in FIGS. 2 and 4.

Figure 4:
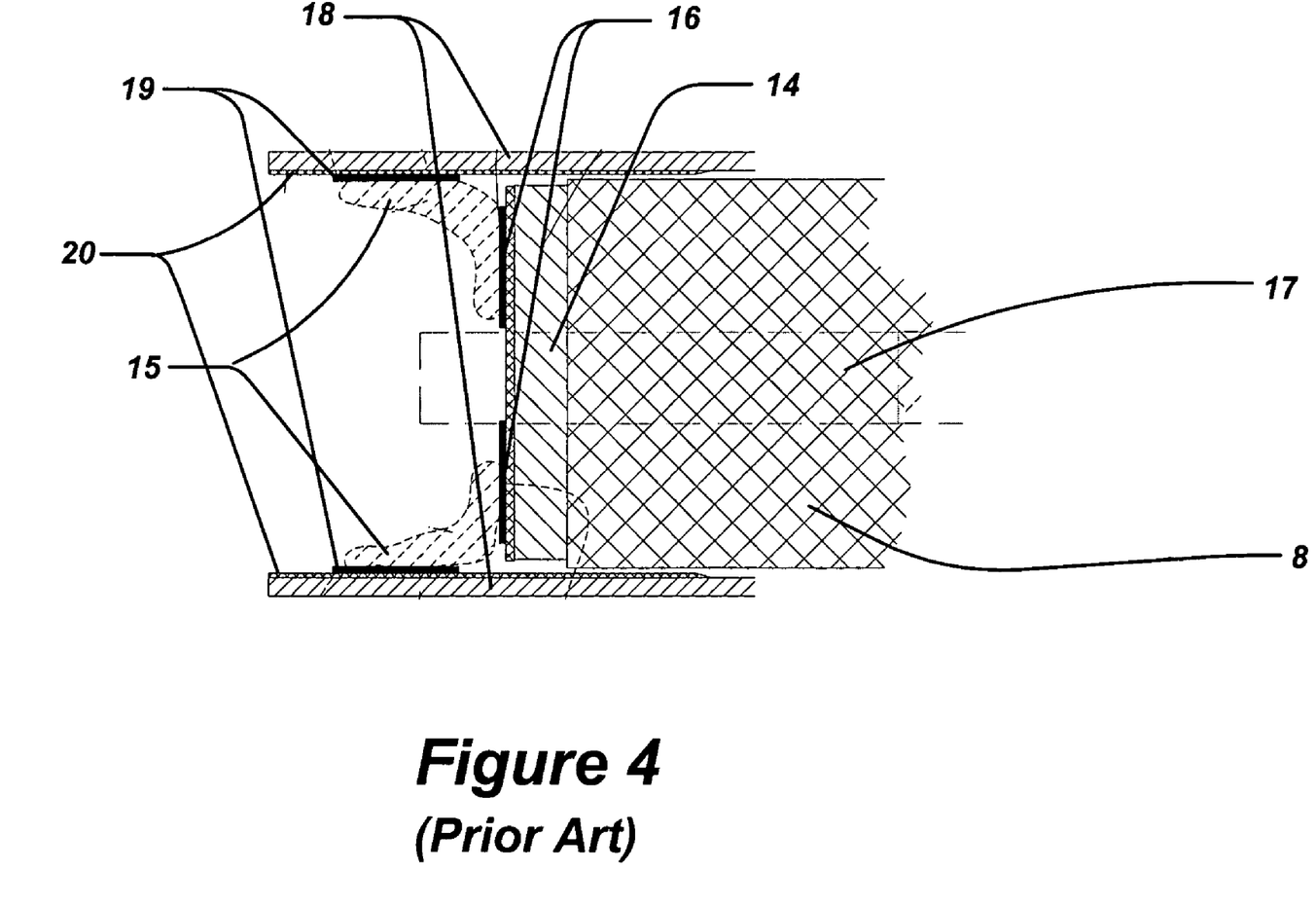
FIG. 4 illustrates electrically coupling the head-gimbal assembly HGA flexure cable connecting pads to flexible circuit bonding pads as is typical in the art.

FIG. 4 illustrates electrically coupling the HGA flexure cable connecting pads to flexible circuit bonding pads as is typical in the art. Typically, bonding methods 15, such as solder bump or gold ball bonding, are utilized to electrically couple the HGA flexure cable connecting pads 19 to the flexible circuit bonding pads 16. As stated above, an alignment pin 17 is utilized to position the circuit board 14 of the relay flexible circuit assembly (not shown). As stated above, the circuit board 14 bonding pads 16 are electrically coupled to the flexure cable connecting pads 19 by methods such as solder bump or gold ball bonding 15.

Because this design requires the electrical bonds 15 to be placed on the inside corners formed by the extended plates 18 of the HGA flexure cable (not shown) and the circuit board 14, it is difficult to create the bonds. It is a very limited space in which to operate. The alignment of the pads 16,18 and their electrical coupling is a great challenge. The quality and efficiency of the process is adversely affected by this challenge. The tooling and equipment costs can be great because of this. In addition, a problem with soldering the electrical connection 15 between the pads 16,18 is that the bonds must be cleaned immediately after soldering. Soldering flux, which is necessary for effective soldering, must be removed. Removing the flux can be difficult and costly. Solder, which consists primarily of tin, can cause component contamination. During soldering, tin may splash out, causing damage to surrounding electrical components and/or disk media.

It is therefore desirable to have a system and method for improving the electrical connection of a hard drive relay flexible circuit assembly to a head-gimbal assembly (HGA) flexure cable that avoids the above-mentioned problems, as well as having additional benefits.

DETAILED DESCRIPTION

Figure 5:
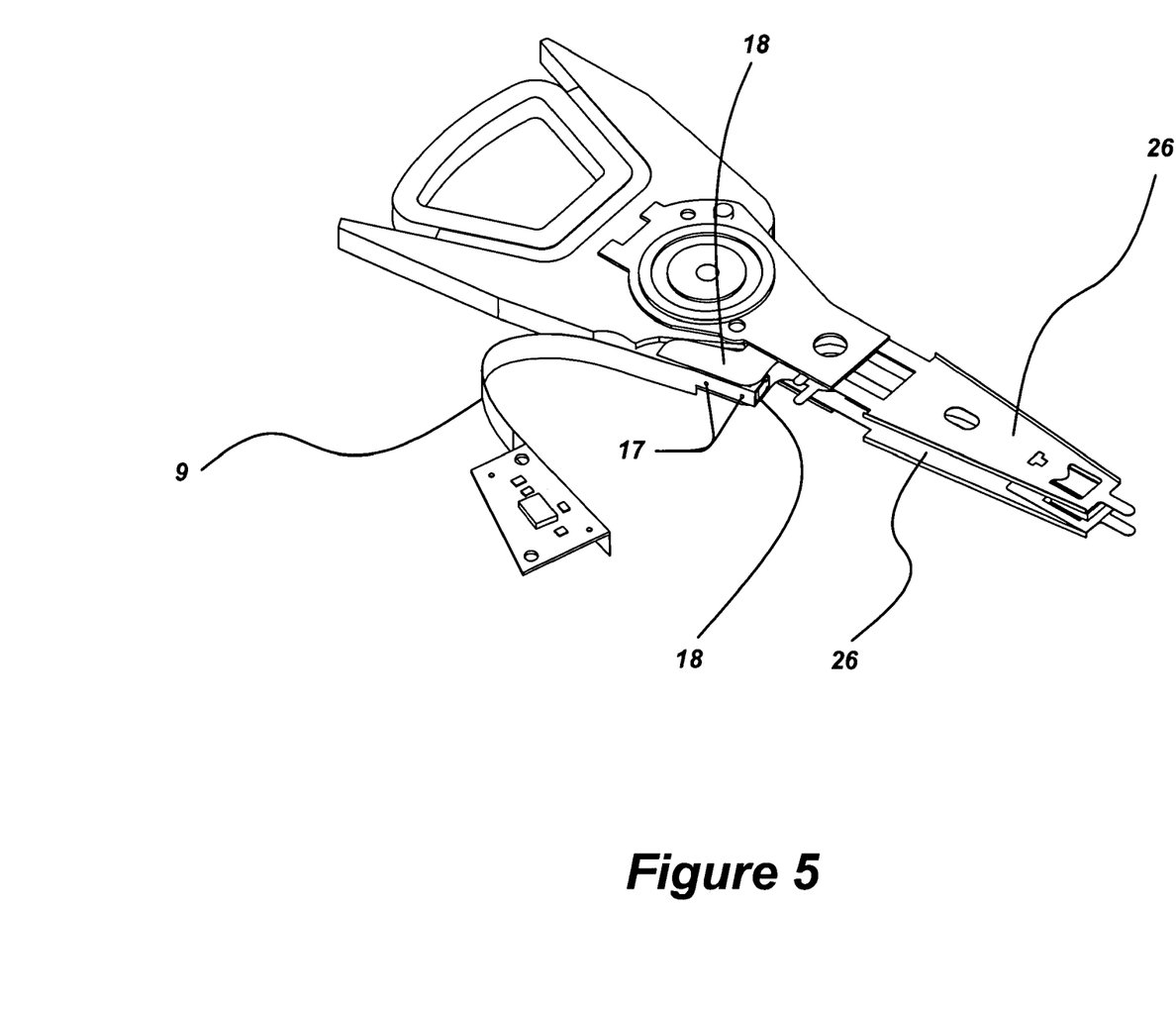
FIG. 5 illustrates a head-gimbal assembly (HGA) with a U-shaped relay flexible circuit-to-flexure cable connector according to an embodiment of the present invention.

FIG. 5 illustrates a head-gimbal assembly (HGA) with a U-shaped relay flexible circuit-to-flexure cable connector according to an embodiment of the present invention. In one embodiment, a U-shaped connector 21 is seated to a portion of the coil carriage 8 (as explained below with respect to FIG. 6). The U-shaped connector 21 is assured correct positioning by one or more alignment pins 17. In this embodiment, pads (not shown) on each of the extended plates 18 of the flexure cables are bonded to pads (not shown) on the top/bottom of the connector 21 (described below).

Figure 6:
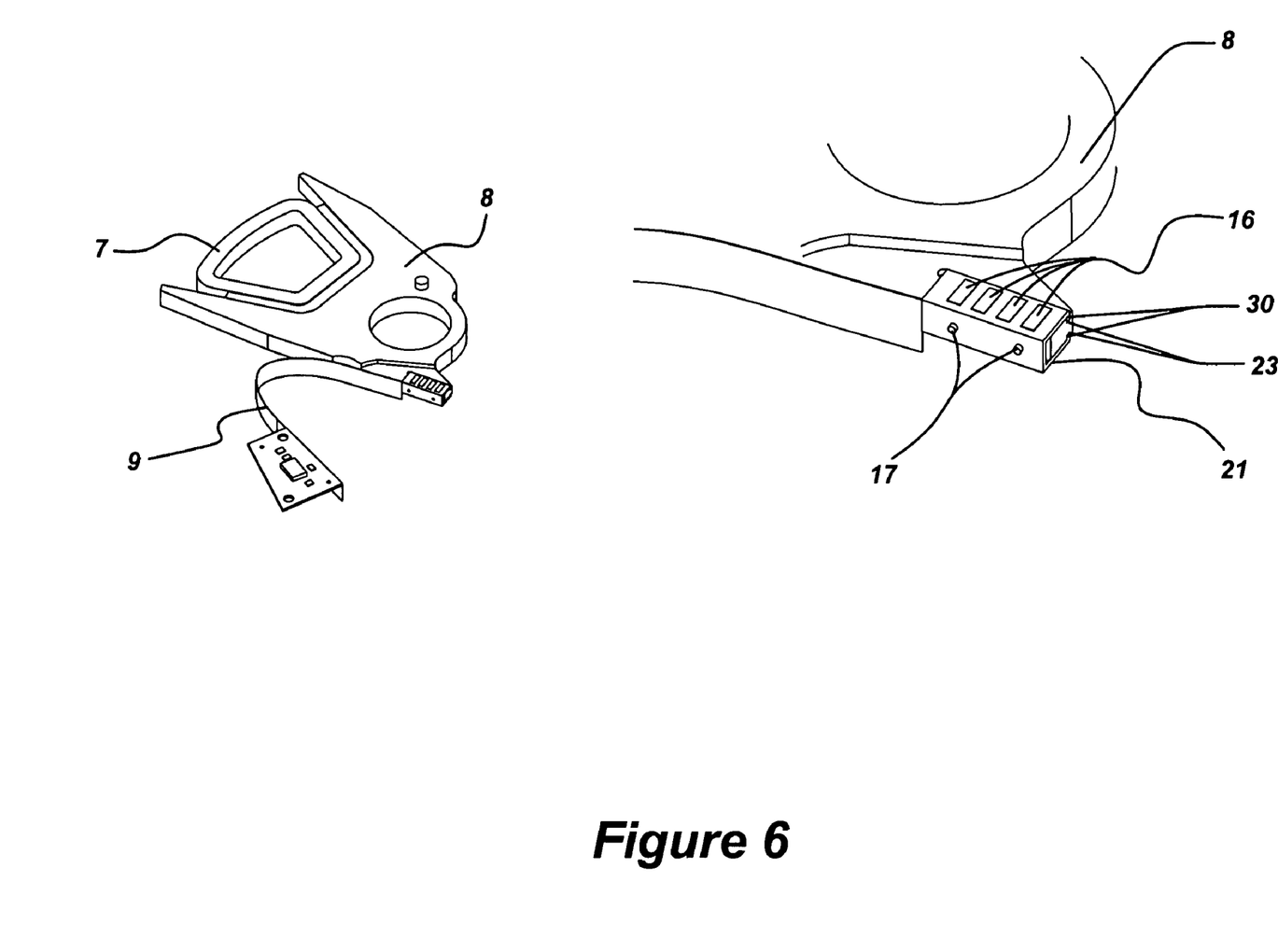
FIG. 6 provides an illustration of the voice coil actuator assembly (without the flexure cables or arms attached) according to an embodiment of the present invention.

FIG. 6 provides an illustration of the voice coil actuator assembly (without the flexure cables or arms attached) according to an embodiment of the present invention. In one embodiment, the U-shaped connector 21, which is attached to the relay flexible cable 9, is coupled to the coil carriage 8. In this embodiment, the connector 21 is placed over a portion of the coil carriage 8, where opposing tabs 25 on opposite sides of the connector 21 seat into grooves 23 located on the top and bottom of the coil carriage 8 (as described in FIG. 7).

Figure 7:
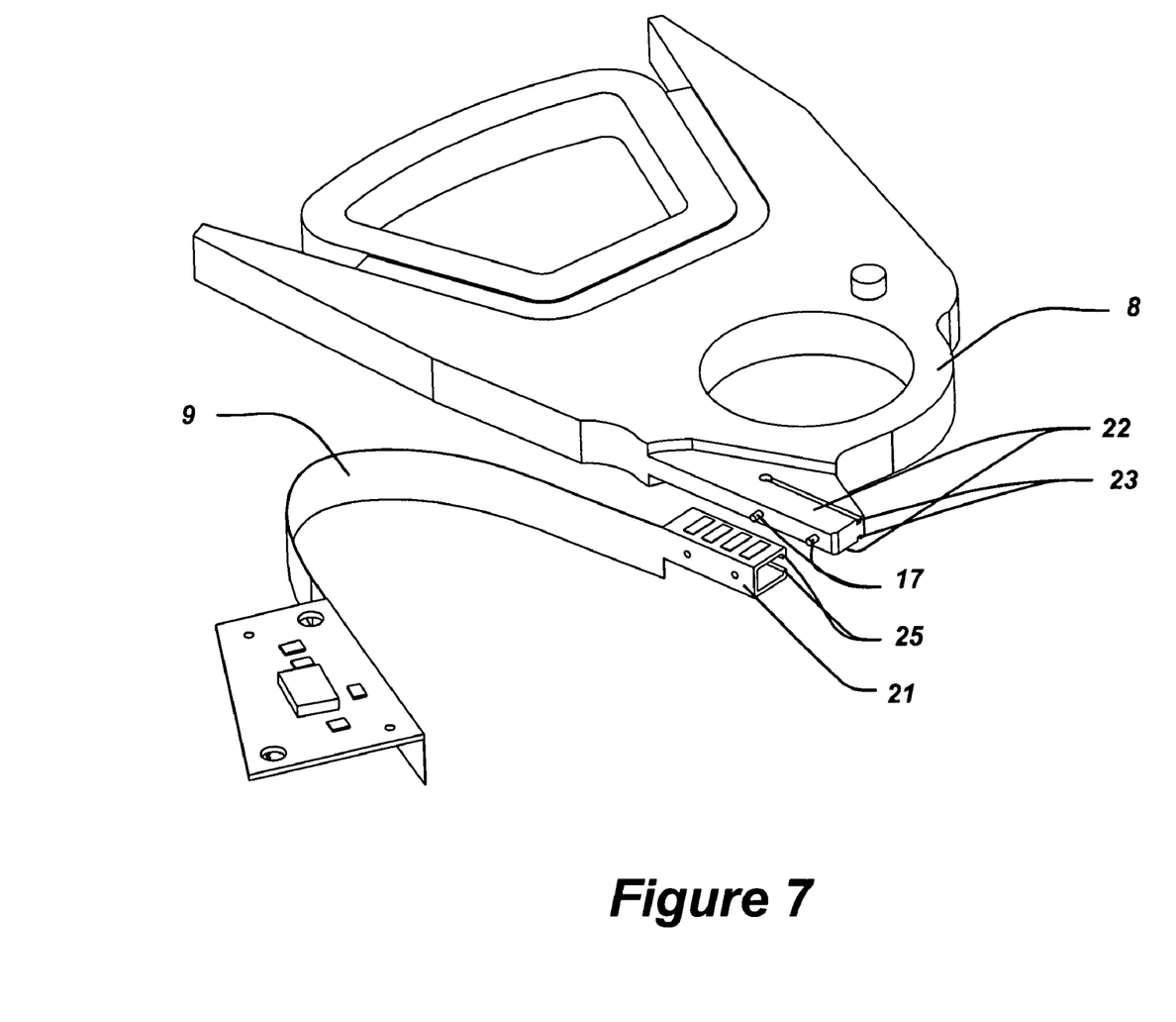
FIG. 7 illustrates the attachment of a U-shaped connector for a relay flexible cable to a coil carriage according to an embodiment of the present invention.

FIG. 7 illustrates the attachment of a U-shaped connector for a relay flexible cable to a coil carriage according to an embodiment of the present invention. In one embodiment, as stated above, the connector 21 is placed over the coil carriage 8. In this embodiment, opposing tabs 25 on the connector 21 are shaped and located to seat in grooves 23 on the top and bottom of the coil carriage 8. In this embodiment, alignment pins 17 on the coil carriage 8 fit into alignment holes 30 on the connector 21 to assure proper positioning.

Figure 8:
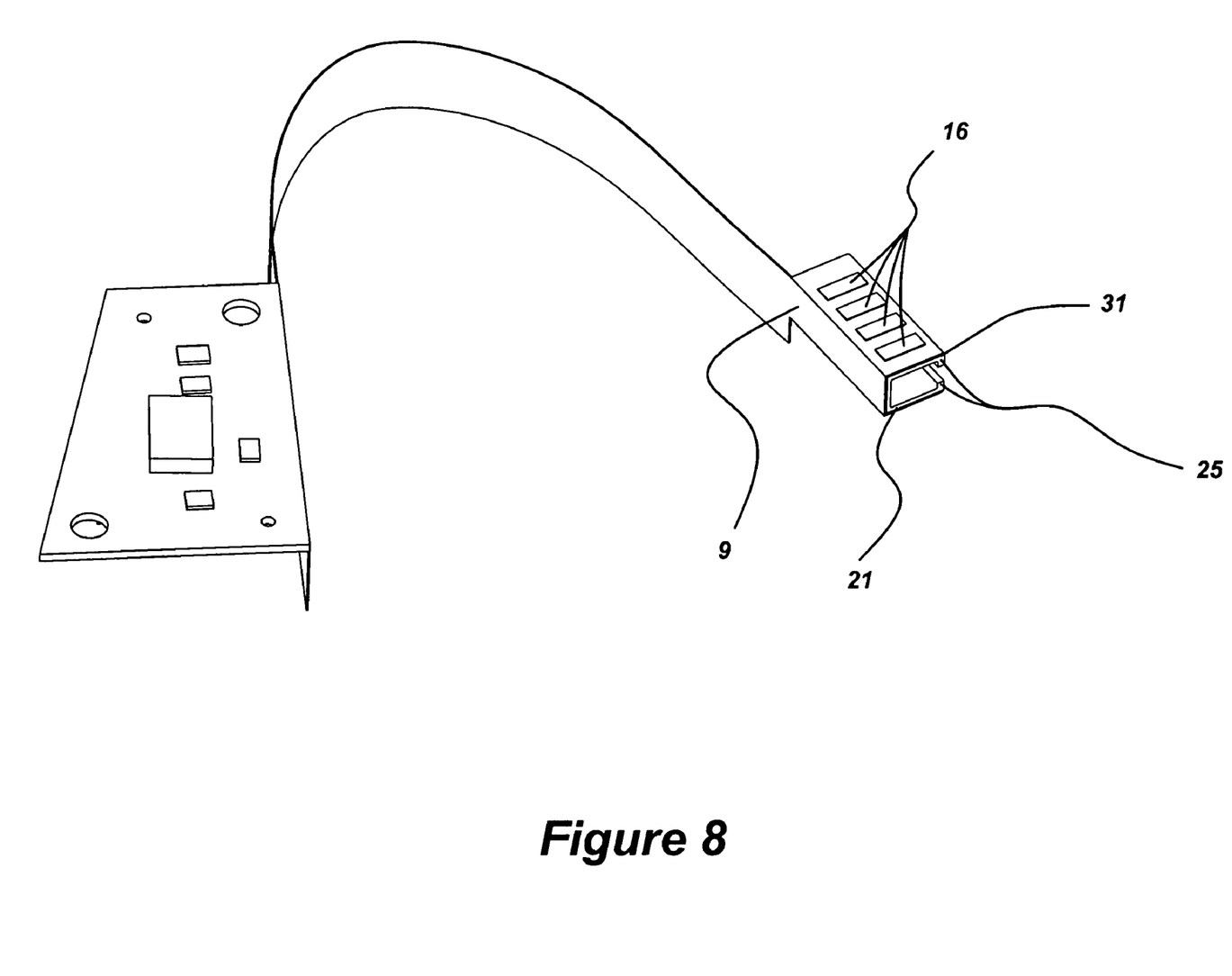
FIG. 8 illustrates a detailed illustration of the relay flexible circuit according to an embodiment of the present invention.

FIG. 8 illustrates a detailed illustration of the relay flexible circuit according to an embodiment of the present invention. In one embodiment, the relay flexible circuit 9 is attached to the connector 21 by epoxy 31 (further described below).

Figure 9:
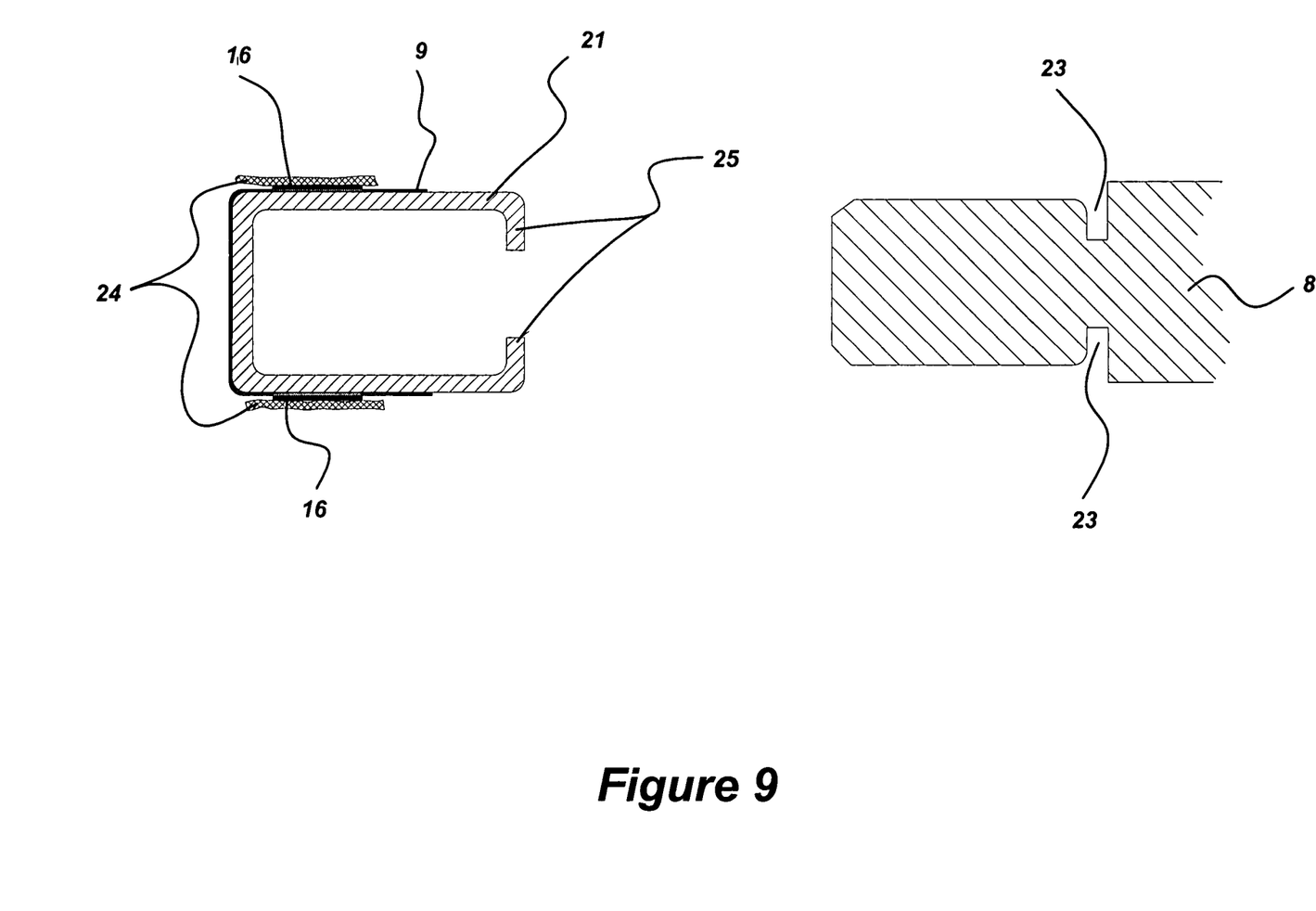
FIG. 9 provides an illustration of the attachment of a relay flexible circuit to a U-shaped connector and the attachment of the connector to a coil carriage according to an embodiment of the present invention.

FIG. 9 provides an illustration of the attachment of a relay flexible circuit to a U-shaped connector and the attachment of the connector to a coil carriage according to an embodiment of the present invention. In one embodiment, as explained above, the relay flexible circuit 9 is attached to the U-shaped connector 21 by epoxy. In this embodiment, bonding pads 16 on the relay flexible circuit 9 are covered with an electrically conductive film 24, such as Anisotropic Conductive Film (ACF). The film 24, which in one embodiment is tacky, adheres to the pads 16.

Figure 10:
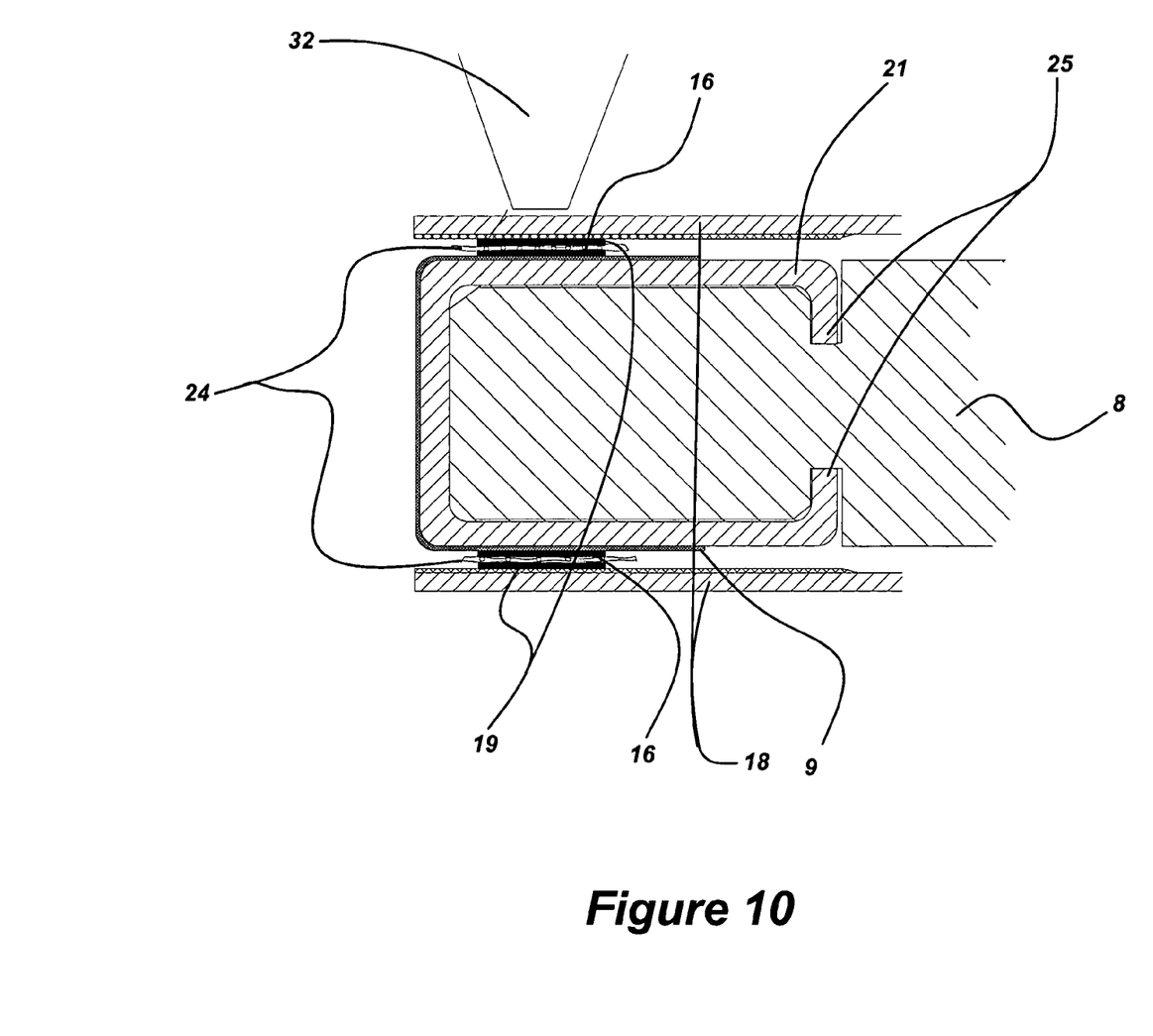
FIG. 10 illustrates the electrical coupling of bonding pads on the relay flexible circuit to connector pads on the HGA flexure cable according to an embodiment of the present invention.

FIG. 10 illustrates the electrical coupling of bonding pads on the relay flexible circuit to connector pads on the HGA flexure cable according to an embodiment of the present invention. In one embodiment, the conductive film 24, which is adhered to the bonding pads 16 is pressed against the connecting pads 19 of the flexure cable extended plates 18. In this embodiment, after positioning the flexure cable extended plates 18, the pads 16,18 are bonded. In this embodiment, a heated bonding tip 32 is pressed against the extended plate 18. The tip 32 heats and compresses the conductive film 24 to bring about the curing process.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system for manufacturing a hard disk drive arm comprising:
   a U-shaped connector to couple a relay flexible cable to a voice coil carriage assembly, said U-shaped connector including a plurality of generally parallel plates, wherein
   said parallel plates include at least one bonding pad to electrically couple said relay flexible cable to a head gimbal assembly (HGA) flexure cable wherein said parallel plates include a plurality of opposing tabs.

2. The system of claim 1, wherein said voice coil carriage assembly has a plurality of grooves, said grooves being located on opposite sides of the voice coil carriage assembly.

3. The system of claim 2, wherein said grooves are shaped and located to accept said tabs.

4. The system of claim 1, wherein said U-shaped connector includes at least one alignment hole and said voice coil carriage assembly includes at least one alignment pin, said alignment hole shaped and located to accept said alignment pin.

5. The system of claim 1, wherein said bonding pad is to be coupled to at least one connecting pad on said HGA flexure cable by a conductive bonding agent.

6. The system of claim 5, wherein said bonding agent includes a plurality of electrically conductive particles.

7. The system of claim 6, wherein said bonding agent is to be compressed between said bonding pad and said connector pad, a number of said particles to form an electrical path between said bonding pad and said connector pad.

8. The system of claim 7, wherein said bonding agent is Anisotropic Conductive Film (ACE).

9. The system of claim 1, wherein said voice coil carriage assembly is molded polymer resin.

10. The system of claim 1, wherein said voice coil carriage assembly is stamped aluminum.

11. The system of claim 1, wherein said U-shaped connector has four bonding pads and said HGA flexure cable has four connecting pads.

12. The system of claim 11, wherein said bonding pads and said connecting pads are gold coated.

13. A system for manufacturing a hard disk drive arm comprising:
    a U-shaped connector to couple a relay flexible cable to a voice coil carriage assembly, said U-shaped connector including a plurality of generally parallel plates, said parallel plates including a plurality of opposing tabs, wherein
    said voice coil carriage assembly has a plurality of grooves shaped and located to accept said tabs; and
    said parallel plates include at least one bonding pad to electrically couple said relay flexible cable to a head gimbal assembly (HGA) flexure cable.

14. The system of claim 13, wherein said U-shaped connector includes at least one alignment hole and said voice coil carriage assembly includes at least one alignment pin, said alignment hole shaped and located to accept said alignment pin.

15. The system of claim 13, wherein said bonding pad is to be coupled to at least one connecting pad on said HGA flexure cable by a conductive bonding agent.

16. The system of claim 15, wherein said bonding agent is Anisotropic Conductive Film (ACF).

17. A system for manufacturing a hard disk drive arm comprising:
    a U-shaped connector to couple a relay flexible cable to a voice coil carriage assembly, said U-shaped connector including a plurality of generally parallel plates, wherein
    said parallel plates include at least one bonding pad to electrically couple said relay flexible cable to a head gimbal assembly (HGA) flexure wherein said U-shaped connector includes at least one alignment hole and said voice coil carriage assembly includes at least one alignment pin, said alignment hole shaped and located to accept said alignment pin.

18. The system of claim 17, wherein said parallel plates include a plurality of opposing tabs.

19. The system of claim 18, wherein said voice coil carriage assembly has a plurality of grooves, said grooves being located on opposite sides of the voice coil carriage assembly.

20. The system of claim 19, wherein said grooves are shaped and located to accept said tabs.

21. The system of claim 17, wherein said bonding pad is to be coupled to at least one connecting pad on said HGA flexure cable by a conductive bonding agent.

22. The system of claim 21, wherein said bonding agent includes a plurality of electrically conductive particles.

23. The system of claim 22, wherein said bonding agent is to be compressed between said bonding pad and said connector pad, a number of said particles to form an electrical path between said bonding pad and said connector pad.

24. The system of claim 23, wherein said bonding agent is Anisotropic Conductive Film (ACF).

25. The system of claim 17, wherein said voice coil carriage assembly is molded polymer resin.

26. The system of claim 17, wherein said voice coil carriage assembly is stamped aluminum.

27. The system of claim 17, wherein said U-shaped connector has four bonding pads and said HGA flexure cable has four connecting pads.

28. The system of claim 27, wherein said bonding pads and said connecting pads are gold coated.

* * * * *